May 31, 1927.
P. J. DARLINGTON
MICROMETER CALIPERS
Filed Sept. 24, 1926
1,631,019
2 Sheets-Sheet 1
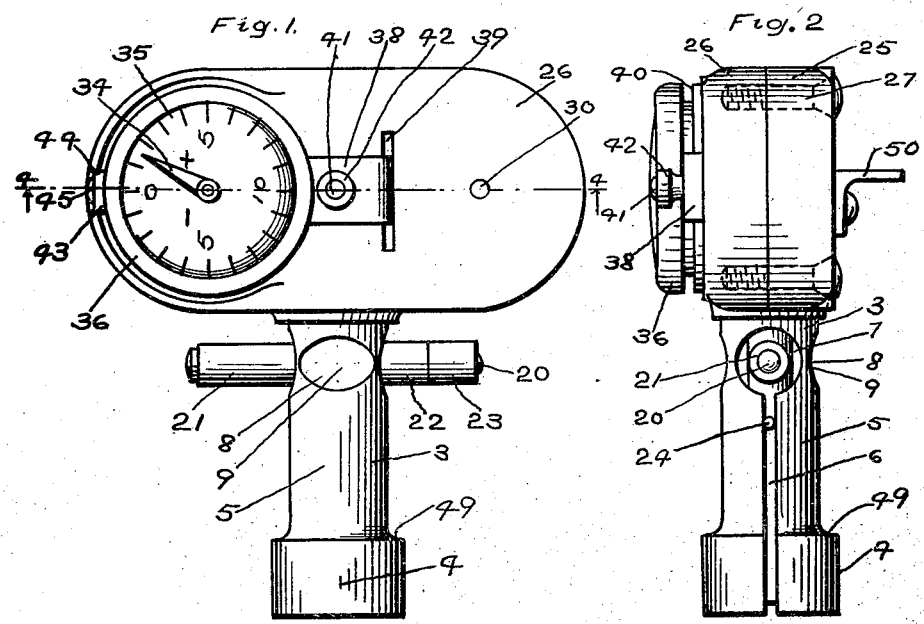
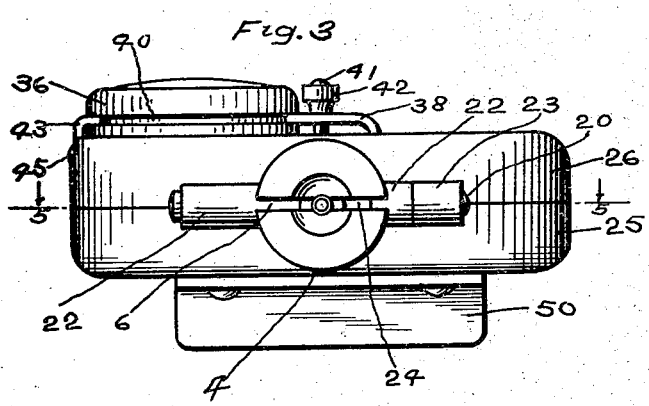
Inventor
Philip J Darlington May 31, 1927.  
P. J. DARLINGTON  
MICROMETER CALIPERS  
Filed Sept. 24, 1926  
1,631,019  
2 Sheets-Sheet 2

Inventor  
Philip J. Darlington

Patented May 31, 1927.

1,631,019

UNITED STATES PATENT OFFICE.

PHILIP J. DARLINGTON, OF BROOKLINE, MASSACHUSETTS.

MICROMETER CALIPERS.

Application filed September 24, 1926. Serial No. 137,500.

This invention relates to micrometer calipers, and especially to those for inside measurement and of the comparator type, in which the caliper is set to read zero in a reference standard bore, and is then used to measure small differences therefrom of the diameters of holes or bores of machine parts in process of production or inspection.

The object of the present invention is to provide an instrument of this character which is relatively cheap to manufacture, occupies smaller space, and has greater strength, durability, accuracy, and speed, and especially in which the measuring and the amplifying elements are more self contained and easily interchangeable for measuring different basic diameters than those of similar character in common use.

In the accompanying drawings, Fig. 1 shows a plan view of an instrument that embodies the invention;

Fig. 2 shows an end elevation;

Fig. 3 shows a front elevation;

Figure 4:
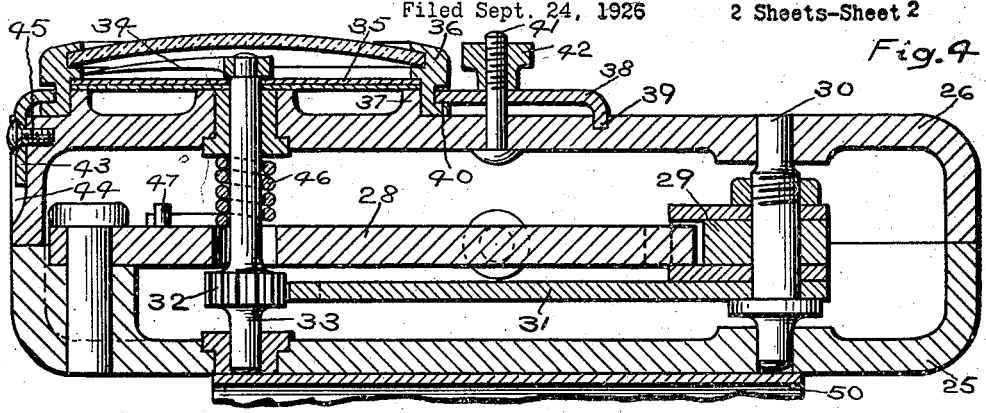
Fig. 4 is a cross section on an enlarged scale on the line 4—4 of Fig. 1.
Figure 5:
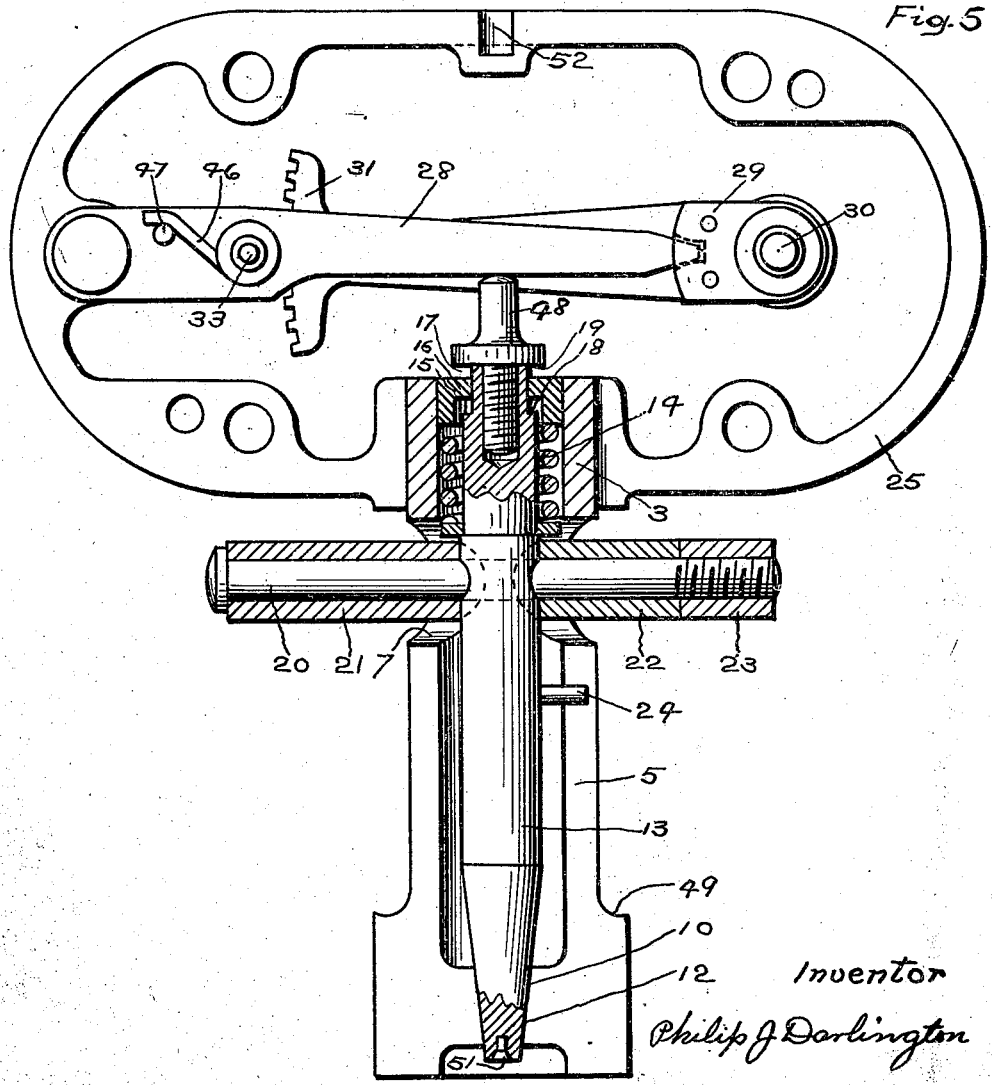
Fig. 5 is a plan view on the same scale as Fig. 4, with the casing cover removed and the measuring plug in section on the line 5—5 of Fig. 3.

The device illustrated comprises an expansible plug gauge 1 an end of which is removably and adjustably clamped into the casing of an amplifying unit 2 that has an indicator arranged to show the amount of expansion of the plug from a normal size.

The plug gauge comprises a hollow cylindrical body 3 having outwardly adjustable measuring surfaces 4 on the ends of arms 5 which are separated by longitudinal slots 6 in the body. These slots extend from the outer end of the body to radial openings 7 which cooperate with adjacent external flats 8 to provide thin flexible sections 9 that permit a yielding set to be given to the measuring surfaces whereby the tapering surfaces 10 in the interior at the measuring end of the body will maintain contact with a correspondingly tapered surface 12 on the forward end of the plunger 13 that is axially movable within the body.

The plunger 13 is normally pressed forward by a spring 14 which is preferably seated on a bush 15 that is frictionally held in the rear end of the bore of the body 3.

The bush 15 has an internal flange 16 extending into an annular space 17 between front and rear shoulders 18 and 19 respectively formed at the end of the plunger 13, and by a screw 48 turned into the end of the plunger. This limits the range of travel of the plunger.

The plunger 13 carries a transverse hand bar 20, extending radially outward through the openings 7 into position for use in manually retracting the plunger 13 against the spring 14.

The hand bar 20 is secured in position on the plunger 13 by sleeves 21 and 22 having end faces formed to fit against the plunger and held in place by a nut 23.

A radial pin 24, carried by the plunger 13, is arranged to slide in one of the slots 6 to prevent rotation of the plunger.

The amplifying unit 2 has a casing 25 and a cover 26 held together by screws 27 that encloses the amplifying and indicating mechanism, which comprises an amplifying arm 28 pivoted at one end and provided at the other end with a tooth 53, meshing into a slot 54 in a segment 29, fastened on an arbor 30, which carries a gear segment 31 meshing into a pinion 32 on a spindle 33. This spindle carries a pointer 34 that reads on a dial 35, which is held in position by a rotatably adjustable bezel 36 seated on a cylindrical hub 37 formed on the upper surface of the cover 26.

The bezel 36 is secured in adjusted position by a clamp 38 which has one end seated in a groove 39 on the cover 26, while the other end bears on a shoulder 40 of the bezel 36 and is clamped thereon by a clamp bolt 41 and thumb nut 42. A retaining clip 43 is seated in a groove 44 in the cover 26 and bears on the shoulder 40 and is held by a screw 45.

A spiral spring 46 on the spindle 33 is anchored to a pin 47 on the arm 28, and is tensioned to rotate the arm toward the plunger 13, thereby maintaining operative contact therewith and preventing backlash of the amplifying mechanism.

An extension 48 of the plunger 13 bears against the amplifying arm 28 forming the operative connection therewith.

The plug gauge body 3 is formed of diameter at the rear end to clamp into adjusted position in the casing 25 while the measuring surfaces 4 at the forward end are of any desired diameter to a shoulder 49.

The measuring surfaces 4 are preferably formed exactly cylindrical when in the fully retracted or smallest contracted position. The conical seats 10 are preferably formed exactly conical and to fit the tapered surface 11 of the plunger 13 when the measuring surfaces are in the fully expanded or largest position.

A thumb plate 50 is attached to the casing 25 in convenient position for holding the instrument while retracting the plunger, when the space available at the rear of the instrument is limited as by a grinding wheel or other obstruction.

A centering hole 51 is formed in the forward end of the plunger 13 and another centering hole 52, axially in line therewith, is formed in the rear end of the casing and cover.

In operation a set of the plug gauges of the different basic diameters is kept in readiness for use, each fully adjusted as to the location and range of travel of its plunger. The desired size of plug gauge is selected and clamped into the casing in that position which causes the pointer to read on the dial the maximum diameter. The plug gauge is then entered and released in a standard ring gauge, or otherwise set to the standard diameter, and the pointer then reads approximately zero. The dial is then adjusted to read exact zero on the pointer by turning the bezel and clamping it in place. The instrument is then applied to the product by manually retracting the plunger and releasing it when the measuring surfaces are in the hole to be measured. The pointer then reads on the dial the exact deviation of diameter from the standard to which the instrument was set.

The instrument may otherwise be set to standard diameter by placing it between adjustable centers and forcing the plunger back until the measuring surfaces are at the desired size to micrometer measurement.

I claim:

1. A micrometer caliper having a casing, a plug with an expansible section attached to said casing, a plunger longitudinally movable in said plug and having a tapered end arranged to engage and expand the plug, an oscillating arm in the casing and held in engagement with and responsive to the movements of said plunger, means for amplifying the movements of said arm, an index arm rotated by said amplifying means, and a graduated scale adjustably mounted in said casing on which the index reads to indicate the amount of expansion of the said plug.

2. A micrometer caliper having a casing, a plug with an expansible section attached to said casing, a plunger longitudinally movable in said plug and having a tapered end arranged to engage and expand the plug, an oscillating arm in the casing and held in engagement with and responsive to the movements of said plunger, means for amplifying the movements of said arm, and means adjustably mounted in said casing and actuated by said arm to indicate the amount of expansion of the said plug.

3. A micrometer caliper having a casing, a longitudinally slitted plug attached to said casing, a plunger longitudinally movable in and having a tapered end adapted to expand said plug, an oscillating arm in the casing held in engagement with and responsive to the movements of said plunger, a lever with a gear segment for amplifying the movement of said arm, an index rotated by said gear segment, and a graduated scale mounted in said casing on which the index reads to indicate the amount of expansion of the said plug.

In testimony whereof I have signed my name to this specification.

PHILIP J. DARLINGTON.